United States Patent [19]

Neier et al.

[11] Patent Number: 4,597,672
[45] Date of Patent: Jul. 1, 1986

[54] CENTER DISCHARGE MIXER FOR FLUENT AND NONFLUENT MATERIAL

[75] Inventors: Benjamin R. Neier, Dodge City, Kans.; Donald L. Stirling, Ridgetown, Canada

[73] Assignee: Stirco, Inc., Ontario, Canada

[21] Appl. No.: 692,217

[22] Filed: Jan. 17, 1985

Related U.S. Application Data

[63] Continuation-in-part of Ser. No. 595,264, Mar. 30, 1984, Pat. No. 4,506,990.

[51] Int. Cl.⁴ .......................... B01F 7/08; B01F 15/02
[52] U.S. Cl. .................................. 366/186; 198/662; 198/676; 366/196; 366/299; 366/321; 366/322; 366/603
[58] Field of Search ............... 366/299, 297, 300, 301, 366/318, 319, 321, 322, 184, 186, 190, 192, 193, 194–196, 603, 90

[56] References Cited

U.S. PATENT DOCUMENTS

| | | | |
|---|---|---|---|
| 2,784,950 | 3/1957 | Bakewell | 366/295 |
| 3,071,352 | 1/1963 | McIntyre | 366/300 |
| 3,421,740 | 1/1969 | Behrens | 366/186 |
| 3,638,920 | 2/1972 | Davis | 366/299 |
| 3,638,920 | 2/1972 | Davis | 366/300 |
| 3,672,640 | 6/1972 | Crose | 366/300 |
| 3,706,442 | 12/1972 | Peat | 366/299 |
| 3,797,807 | 3/1974 | Behrens | 366/300 |
| 3,995,836 | 12/1976 | Carter et al. | 366/300 |
| 4,083,501 | 4/1978 | Ryan | 241/101.7 |
| 4,298,289 | 11/1981 | Walley | 366/603 |
| 4,310,252 | 1/1982 | Ryan | 366/299 |
| 4,480,927 | 11/1984 | Peat | 366/299 |

FOREIGN PATENT DOCUMENTS 501170 6/1930 Fed. Rep. of Germany.

Primary Examiner—Robert W. Jenkins
Attorney, Agent, or Firm—Zarley, McKee, Thomte, Voorhees & Sease

[57] ABSTRACT

A feed mixer includes a mixer tank with a bottom wall having two curved wall portions defining the bottom of a large main chamber and smaller auxiliary chamber with an elongated ridge therebetween. A rotor having several elongated rotor bars adjacent the outer periphery is supported in the main chamber for rotation in a direction for movement of the rotor bars across the bottom of the main chamber toward the auxiliary chamber. The auxiliary chamber includes a pair of stacked augers adapted for moving material from one end of the tank to the other in opposite directions. Material is thus continuously cycled from the main chamber into a lower portion of the auxiliary chamber where it is moved toward one end of the mixer, forced upwardly into an upper portion of the auxiliary chamber and then directed toward the opposite end of the tank while spilling back into the main chamber for efficient end-to-end mixing of even long stringy hay material.

12 Claims, 24 Drawing Figures

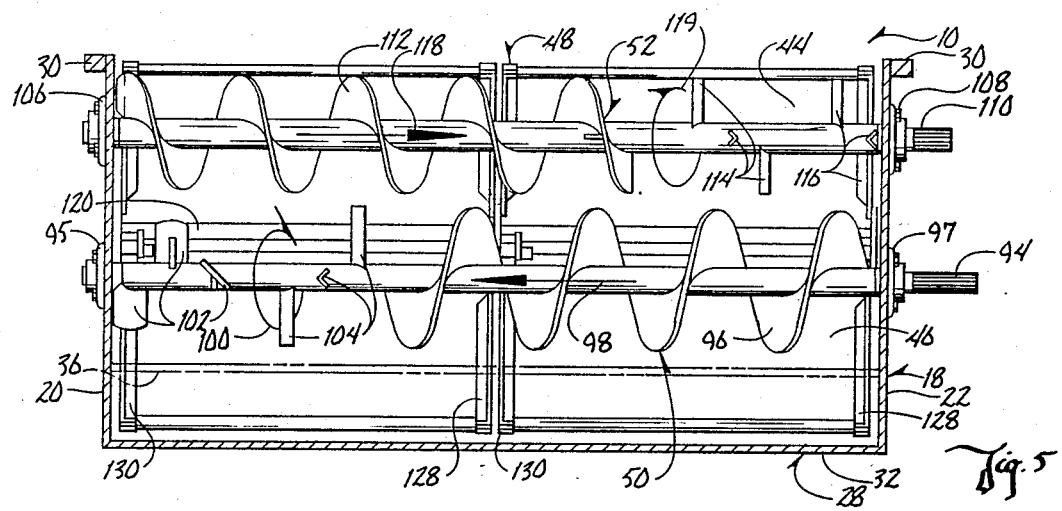

CENTER DISCHARGE MIXER FOR FLUENT AND NONFLUENT MATERIAL

CROSS REFERENCE TO RELATED APPLICATION

This is a continuation-in-part of copending patent application Ser. No. 595,264 filed on Mar. 30, 1984 now U.S. Pat. No. 4,506,990.

BACKGROUND OF THE INVENTION

The present invention is directed generally to an improved mixer for fluent and nonfluent material and to an improved method of mixing material within a mixer tank. More specifically, the present invention is directed to an improved mixer wherein material is mixed by a large rotor within a main chamber of a tank and then moved over a ridge into a lower portion of an auxiliary chamber wherein the material is axially converged toward a generally centrally located discharge opening. When the opening is closed, the material is piled upwardly into an upper portion of the auxiliary chamber and advanced toward an end wall for spillage back into the main chamber and for downward movement back to the lower portion of the auxiliary chamber.

In the cattle industry, there is a recent trend back to the farmer feeder. In such operations, the cattle are fed a greater proportion of roughage such as hay and silage and a less proportion of grain. Furthermore, in large cattle operations, a farmer may have to mix and distribute as many as forty or fifty tank loads of feed per day. Accordingly, there is a need for an improved mixer capable of quickly and efficiently mixing and discharging large quantities of hay, silage and/or grain.

Feed mixers generally are known in the art. Copeland et al U.S. Pat. No. 3,090,605, in which inventor Neier herein was a co-inventor, disclosed a mixer capable of efficient end-to-end mixing. That mixer included an arrangement of upper and lower augers for moving material in opposite directions. That mixer was not suited for handling roughage such as long stringy hay, however, since the hay would become wedged between the lower auger and the downwardly and inwardly tapering side walls of the main chamber.

Crose U.S. Pat. No. 3,672,640 disclosed another mixer wherein a combination auger with rotor paddles was rotatably supported in a main chamber with a single discharge auger in a side chamber. A problem of this arrangement is the lack of end-to-end mixing. For example, if additives are poured into the tank at the downstream end of the main auger, no mixing of the additive with the material at the upstream end of the tank will occur. Furthermore, the Crose mixer is limited to the handling of fluent materials. The wall between the main and side chambers is so low that material is thrown laterally with substantial force. If hay were to be handled, it would be poked into the discharge auger by the rotors causing a binding action and potential damage.

A mixer designed to handle hay was disclosed in Walley U.S. Pat. No. 4,298,289. A rotor in a main chamber mixes the material and feeds it to a single rotating agitator in a side discharge chamber. Whereas this mixer is capable of handling hay, it has limiting mixing capabilities and virtually no end-to-end mixing action.

Accordingly, a primary object of the present invention is to provide an improved material mixer.

A more specific object is to provide a feed mixer capable of handling hay and roughage without binding action of the material therein.

Another object is to provide such a mixer with efficient end-to-end mixing capability.

Another object is to provide a mixer wherein material is mixed in a main chamber by a plurality of rotating rotor bars and wherein material is cycled through an auxiliary chamber wherein the material is advanced from end-to-end in opposite directions.

Another object is to provide a mixer wherein material is continuously cycled between the main and auxiliary chambers thereof and back and forth from end-to-end prior to discharge.

Another object is to provide an improved mixer capable of cleaning and discharging substantially all of the material from the main chamber.

Another object is to provide an improved mixer which is simple and rugged in construction, economical to manufacture and efficient in operation.

SUMMARY OF THE INVENTION

The improved mixer of the present invention includes a mixer tank having a bottom wall which is shaped to provide a relatively large curved wall portion defining the bottom of a main chamber and a second smaller curved wall portion defining the bottom of an auxiliary chamber with an elongated ridge at the junction of the curved wall portions. A rotor having several elongated rotor bars adjacent the outer periphery thereof, is supported in the main chamber for rotation in a direction for movement of the rotor bars across the first wall portion toward the auxiliary chamber.

The auxiliary chamber includes a pair of stacked augers adapted for moving material axially of the tank in opposite directions. Material is thus continuously cycled first in a mixing rotary motion within the main chamber whereupon material is presented to the lower auger in the auxiliary chamber for movement axially of the tank. A discharge gate is provided in the auxiliary chamber at a position between and substantially spaced from both end walls. Feed is thus continuously cycled past the discharge gate and is ready to be emptied at any time. When the gate is closed, material piles up at the closed gate and the upper auger directs it toward the opposite ends of the tank. Much of the feed spills back into the main chamber with the remaining feed being recycled back downwardly to the lower auger in the auxiliary chamber.

The ridge between the main and auxiliary chambers is so positioned that material is fluffed upwardly by the rotor toward the auxiliary chamber but not forced or pinched between the rotor and lower auger. Finally, spring acutated wiper blades are provided on one or more of the rotor bars for cleaning and discharging substantially all of the material from the main chamber.

BRIEF DESCRIPTION OF THE DRAWINGS

FIG. 5 is a partially sectional side view showing the stacked augers in the auxiliary chamber;

FIG. 6 is a partial sectional rear view of the mixer taken along line 6—6 in FIG. 2;

FIG. 7 is a perspective view of the upper auger;

FIG. 8 is a perspective view of the lower auger;

DESCRIPTION OF THE PREFERRED EMBODIMENTS

Figure 1:
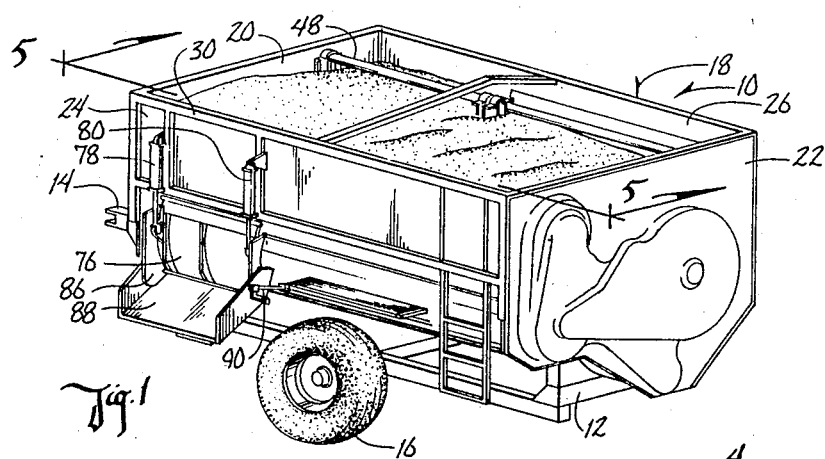
FIG. 1 is a perspective view of the mixer of the present invention.
Figure 2:
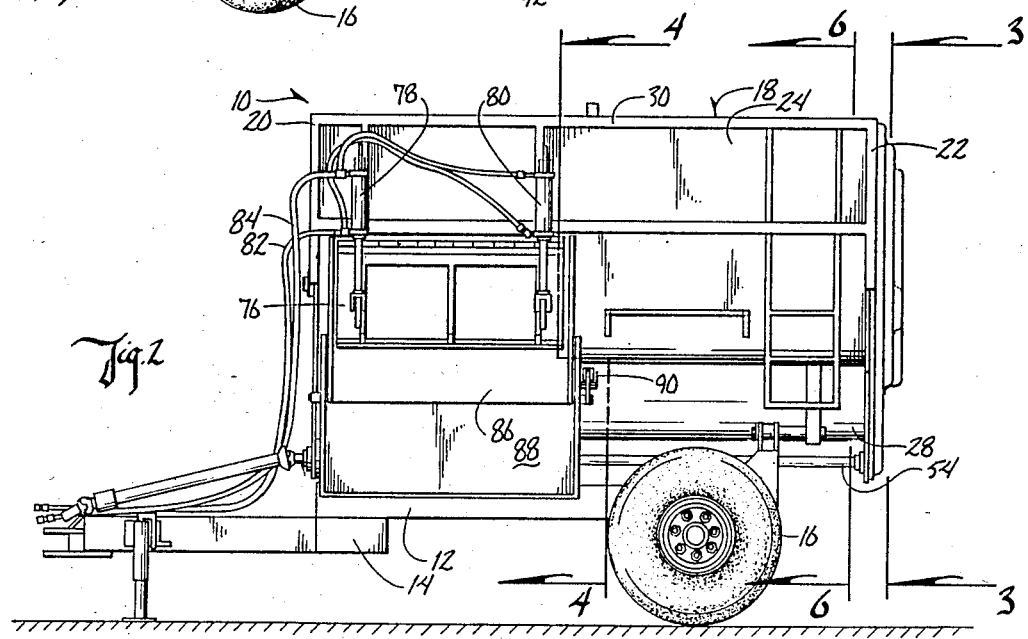
FIG. 2 is an enlarged side elevational view of the mixer.

The feed mixer 10 of the present invention is illustrated in FIGS. 1 and 2 as supported on a single axle trailer frame 12 having a forwardly extended tongue 14 and a pair of ground wheels 16. It will be apparent that the mixer could alternately be mounted stationarily or on a truck or other vehicle but the trailer frame mounting is advantageous for ease of handling and for convenient use of the PTO drive train.

Mixer 10 includes a mixer tank 18 having forward and rearward end walls 20 and 22, opposite side walls 24 and 26 and a bottom wall 28 (FIG. 6). A peripheral frame, referred to generally at 30, surrounds, supports and connects the various tank walls together.

Referring to FIG. 6, bottom wall 28 includes a first relatively large radius curved wall portion 32 defining the bottom of a main chamber 34 and a second relatively smaller radius curved wall portion 36 defining the bottom of an auxiliary chamber 38 which is laterally disposed relative to main chamber 34. An elongated ridge 40 spans the length of the tank at the junction of the curved wall portions 32 and 36. An elongated generally wedge-shaped divider 42 spans the length of the tank on the interior surface of side wall 24 as a partial divider between upper and lower portions 44 and 46 of auxiliary chamber 38.

Figure 3:
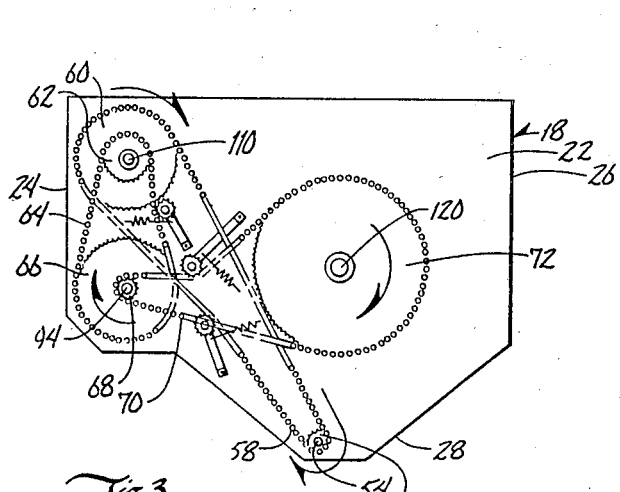
FIG. 3 is a rear sectional view of the drive train for the rotor and augers, taken along line 3—3 in FIG. 2.

FIG. 6 also illustrates the arrangement of mixing units within the tank. These include a large rotor 48 in main chamber 34 and a pair of stacked augers including a lower auger 50 and upper auger 52 in auxiliary chamber 38. Each of these units include central shafts which are rotatably supported in the respective chambers and which extend rearwardly through rearward end wall 22 for driven connection to the PTO drive shaft 54 which extends along the underside of mixer 10 below bottom wall 28. Drive shaft 54 carries a small drive sprocket 56 which is connected by chain 58 to a large driven sprocket 60 on upper auger 52 for a speed reduction drive connection therebetween. Upper auger 52 carries a smaller drive sprocket 62 which is connected by chain 64 to a large driven sprocket 66 on lower auger 50 for a further speed reduction drive connection therebetween. Finally, a small drive sprocket 68 on lower auger 50 is connected by chain 70 to a large driven sprocket 72 on rotor 48 for a substantial speed reduction drive connection therebetween. Various spring arm mounted idler sprockets are provided as illustrated in FIG. 3 for each of the three drive chains 58, 64 and 70.

Figure 4:
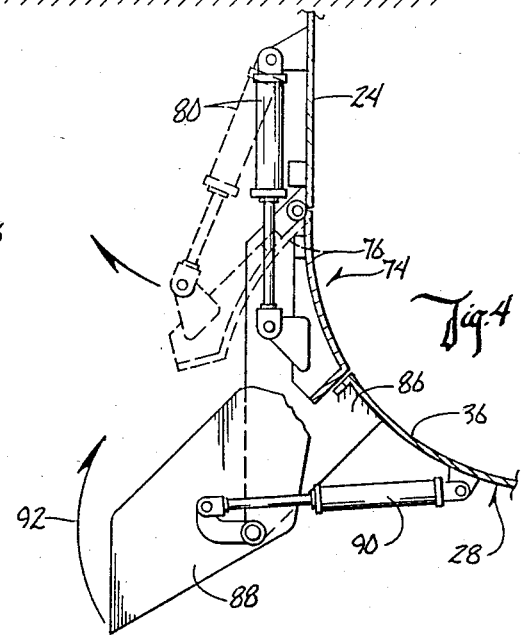
FIG. 4 is a partial rear sectional view taken along line 4—4 in FIG. 2 and showing the movable door over the discharge opening of the mixer.

A discharge opening 74 is shown in FIGS. 1, 2 and 4 at an exterior lower forward location on auxiliary chamber 38. For side discharge mixers, the discharge opening 74 is preferably situated at the junction between side wall 24 and bottom wall portion 36. A movable door 76 is hinged along its upper edge for pivotal movement between the solid and dotted line positions illustrated in FIG. 4 for closing and opening discharge opening 74 respectively. Movement of door 76 is controlled by a pair of hydraulic cylinders 78 and 80 which are connected to a pair of hydraulic lines 82 and 84 which extend forwardly for connection to a tractor hydraulic system.

A discharge chute 86 extends downwardly and outwardy from discharge opening 74 and has a movable discharge guide 88 pivotally connected at the base of the chute 86 for up and down pivotal movement by hydraulic cylinder 90 as indicated by arrow 92 in FIG. 4.

The structure and arrangement of lower and upper augers 50 and 52 are illustrated in FIGS. 5-8. The term auger is used loosely to refer to a rotatable mixer capable of advancing material axially therealong and is not limited to the conventional structure wherein flighting is extended along substantially the entire length thereof. Lower auger 50 is rotatably supported on forward and rearward end walls 20 and 22 by bearings 95 and 97 respectively. Central shaft 94 has flighting 96 beginning at a position adjacent rearward end wall 22 and extending forwardly over slightly more than half of the length of the shaft for conveying material forwardly in the direction of arrow 98 in response to rotation of the lower auger in the direction of arrow 100. Forwardly of flighting 96, central shaft 94 carries a number of radially extended paddles arranged in axially and circumferentially spaced-apart relation. These paddles include several radially directed fins 102 adjacent the forward end of the shaft, which fins are inclined 45° relative to a plane perpendicular to the axis of lower auger 50 so as to operatively retard the forward motion of material in response to rotation of the auger in the direction of arrow 100. This facilitates the upward movement of material toward the upper auger 52. Between flighting 96 and fins 102 additional paddles are provided in the form of radially directed angle iron members 104 for chopping the feed material being advanced forwardly by the auger flighting 96. The angle iron members 104 are also so disposed that the inclined flanges thereof tend to move material forwardly toward the fins 102 in response to rotation of the lower auger.

Upper auger 52 is shown as being supported directly above lower auger 50 between forward and rearward end walls 20 and 22 by bearings 106 and 108. Central shaft 110 carries flighting 112 from a position adjacent forward end wall 20 to a position just beyond the halfway point between forward and rearward end walls 20 and 22. The upper auger also includes a number of radially extended paddles arranged in axially and circumferentially spaced-apart relation between the flighting 112 and rearward wall 22. These paddles are shown as radially extended angle iron members 114 and 116. Members 114 are so disposed that the inclined flanges thereof tend to advance material rearwardly in the direction of arrow 118 in response to rotation of the upper auger in the direction of arrow 119. The endmost members 116, however, are oppositely directed for retarding the rearward flow of material in response to rotation of upper auger 52 in the direction of arrow 119.

Figure 9:
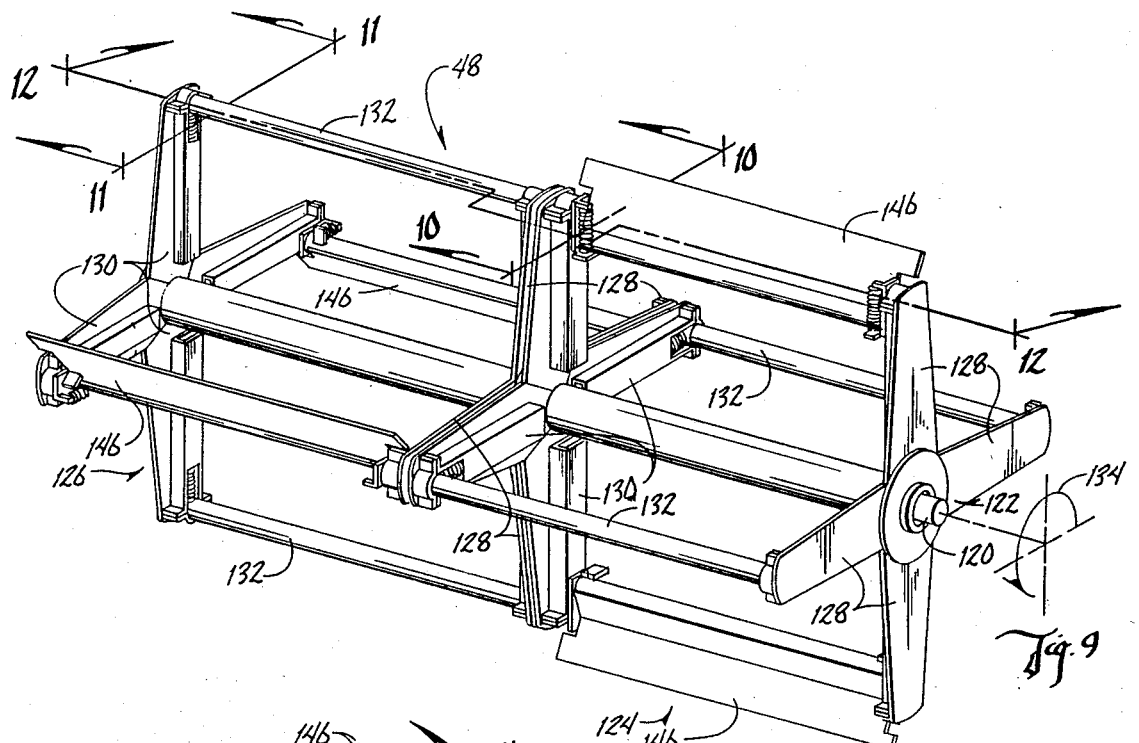
FIG. 9 is a perspective view of the rotor.

Rotor 48 is illustrated in FIG. 9 as including a central shaft 120 having a forward end 122 with forward and rearward rotor sections 124 and 126 fixed thereon for rotation therewith. Whereas the forward and rearward rotor sections 124 and 126 appear to be rotated 90° relative to one another, they are otherwise identical and accordingly like reference numerals will be used to refer to like parts of each.

Each rotor section includes forward rotor arms 128 which are circumferentially aligned with a set of rearward rotor arms 130. An elongated rotor bar 132, preferably in the form of a pipe, is axially extended between and connected to the outer ends of each aligned pair of forward and rearward rotor arms 128 and 130. These pipes turn and mix the feed in main chamber 34 in response to rotation of the rotor in the direction of arrow 134. The number of rotor arms at each end of a rotor section is not critical to the present invention although a single arm would result in rather slow mixing and more than five arms may tend to churn the feed as a unit without adequate mixing action.

Figures 10, 11:
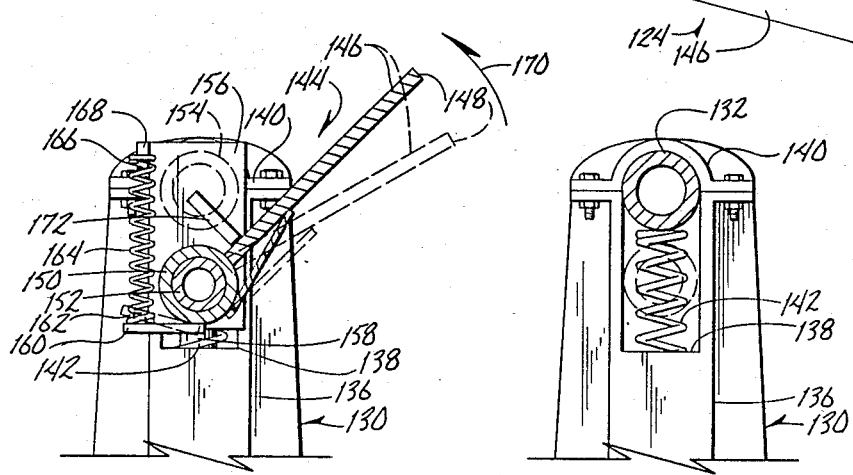
FIG. 10 is an enlarged partially sectional end view of the spring-loaded wiper blade on a rotor bar.
FIG. 11 is an enlarged partially sectional end view of the spring-mounted rotor bar, as seen on line 11—11 in FIG. 9.

Referring to FIG. 11, each rotor bar 132 is supported for limited radial movement relative to the associated rotor arms 128 and 130. Specifically, a channel member 136 on the surface of the rotor arm facing the rotor bar is provided with an open ended slot 138 for receiving one end of a rotor bar 132. The open end of slot 138 is closed by a generally inverted U-shaped closure 140 which is bolted to channel member 136 as shown. A compression spring 142 has its lower end fixed within channel 136 and its upper end bearing against the underside of rotor bar 132 to urge it radially outwardly of the rotor.

The rotor arms 128 and 130 are of a length such that the rotor bars 132, in their outermost positions, travel in an arc substantially conforming to and adjacent to the first curved wall portion 32 of bottom wall 28 as shown in FIG. 6.

Figure 12:
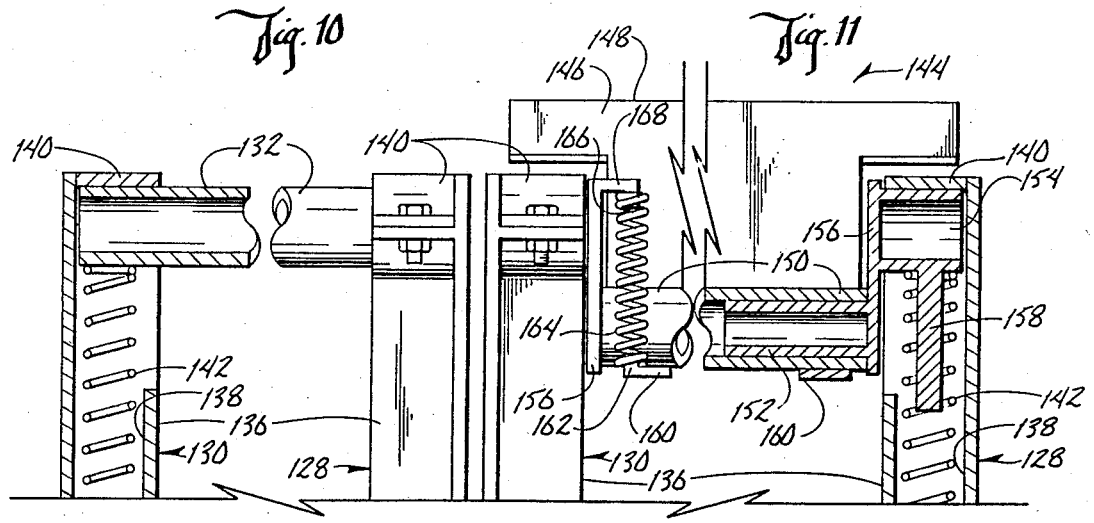
FIG. 12 is an enlarged foreshortened and partially sectional side view of the rotor bars, taken along line 12—12 in FIG. 9.

An elongated wiper assembly 144 may be substituted for one or more rotor bars 132 on each rotor section. Referring to FIGS. 10 and 12, wiper assembly 144 includes an elongated wiper blade 146 having a straight continuous outer edge 148 and an inner edge fixed to a sleeve 150 for pivotal movement on pipe 152 which is fixed in radially offset relation from a pair of end sleeves 154 by a pair of end plates 156. End sleeves 154 each include a depending rod 158 for insertion into compression spring 142 as shown in FIG. 12. Sleeve 150 has a pair of tangential flanges 160 adjacent the opposite ends thereof which include an upstanding stub 162 for engaging one end of a compression spring 164. The other end of spring 64 is engaged upon an oppositely directed stub 166 on end plate flange 168 for urging wiper blade 146 in the direction of arrow 170 in FIG. 10 toward engagement with a stop member 172. Wiper blade 146 is thus free to pivot from the solid line position to the dotted line position indicated in FIG. 10 against the urging of compression spring 164 in response to encountering an obstruction. Each wiper blade is thus radially movable under the influence of compression springs 142 and pivotally movable under the influence of compression springs 164.

Figure 13:
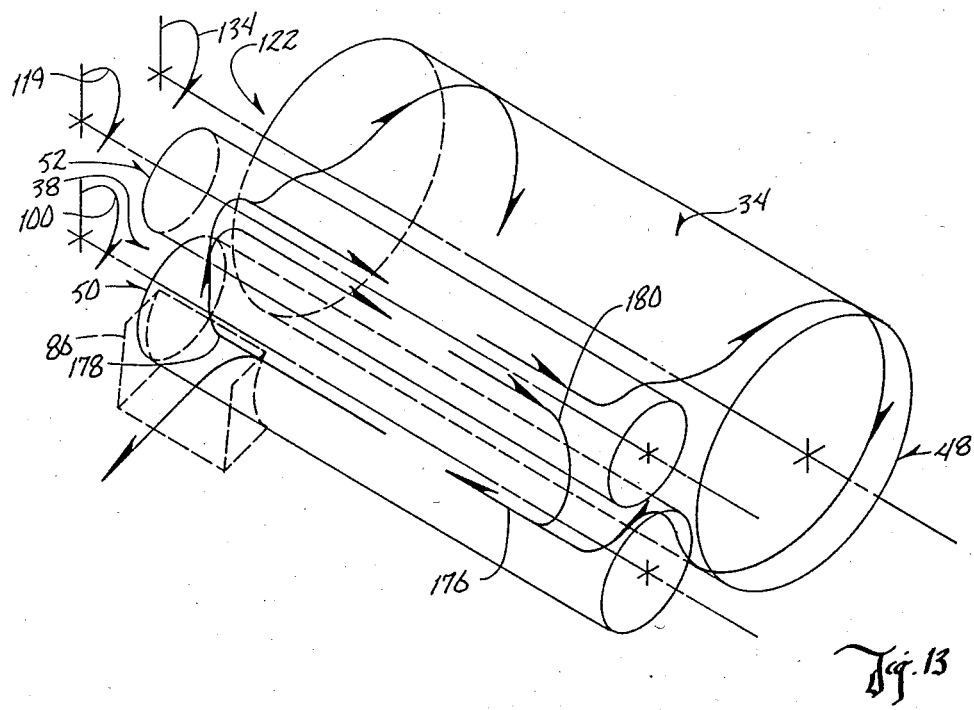
FIG. 13 is a diagrammatic perspective illustration of the flow path of material through the mixer.

In operation, feed material is loaded into mixer tank 18 and any supplements or additives may be poured in with or over the feed material at any location along the tank. Upon engagement of the PTO drive linkage, the rotor 48 and upper and lower augers 50 and 52 are rotated in the directions indicated in FIG. 6 to cause movement of feed in a circulating path indicated in FIG. 13. Line 174 in FIG. 6 indicates the top surface of material when the tank is full. It is preferred that the tank be filled only to such a level that the rotor bars 132 remain exposed at their uppermost positions. This facilitates a falling action of the feed material over the rotor bar which results in improved mixing. As the rotor 48 turns, some of the material is simply circulated in a rotary path within main chamber 34 while being agitated by the rotor bars 132. Other material is fluffed upwardly over ridge 40 toward lower auger 50 for movement rearwardly along a lower portion of auxiliary chamber 38 in the direction of arrow 176. That material is chopped by the paddles 102 and 104 forwardly of the flighting for further mixing. When door 76 is in its closed position, rearward movement of material in the lower portion of auxiliary chamber 38 is retarded by the fins 102 whereupon the material moves upwardly in the direction of arrow 178 to a forward upper portion of auxiliary chamber 38. Upper auger 52 further mixes the material and advances it rearwardly along the upper portion of auxiliary chamber 38. The material closest to main chamber 34 spills over into the main chamber for recycling therein by the rotor 48. Other material is advanced to the rearward end of auxiliary chamber 38 where it is circulated back downwardly in the direction of arrow 180 to lower auger 50.

Whereas rotor 48 is not designed to induce axial movement of material in the main chamber 34, that material is continuously cycled back and forth in the auxiliary chamber and recirculated back to the main chamber at various axial positions therealong for thorough mixing of feed in the tank regardless of where it was initially deposited. Furthermore, the material is constantly circulated past discharge opening 74 so that the tank can readily be emptied at any time when the door 76 is opened. The retarding action of the fins 102 at the forward end of the lower auger 50 facilitates the discharge of material through discharge opening 74.

Another characteristic of the feed mixer 10 is that when the tank is full, material tends to pile up at the end of the auxiliary chamber 38 which is opposite to the end where the discharge opening 74 is situated.

Note that the discharge opening 74 could be situated at the rearward end of auxiliary chamber 38 and the operation would remain the same as long as the upper and lower augers 50 and 52 were reversed for movement of material in the opposite axial direction. Likewise, the discharge opening could be situated centrally of the auxiliary chamber in which case the lower auger would be designed to pull material from both ends toward the middle and the upper auger would direct material toward both ends from the middle. In all of these embodiments, the upper auger moves material in an axial direction opposite to the direction of flow of material therebelow by the lower auger. This is generally true at any position along the upper and lower augers but for those end positions where one or the other auger may have reverse operating paddles or kickers.

Figure 14:
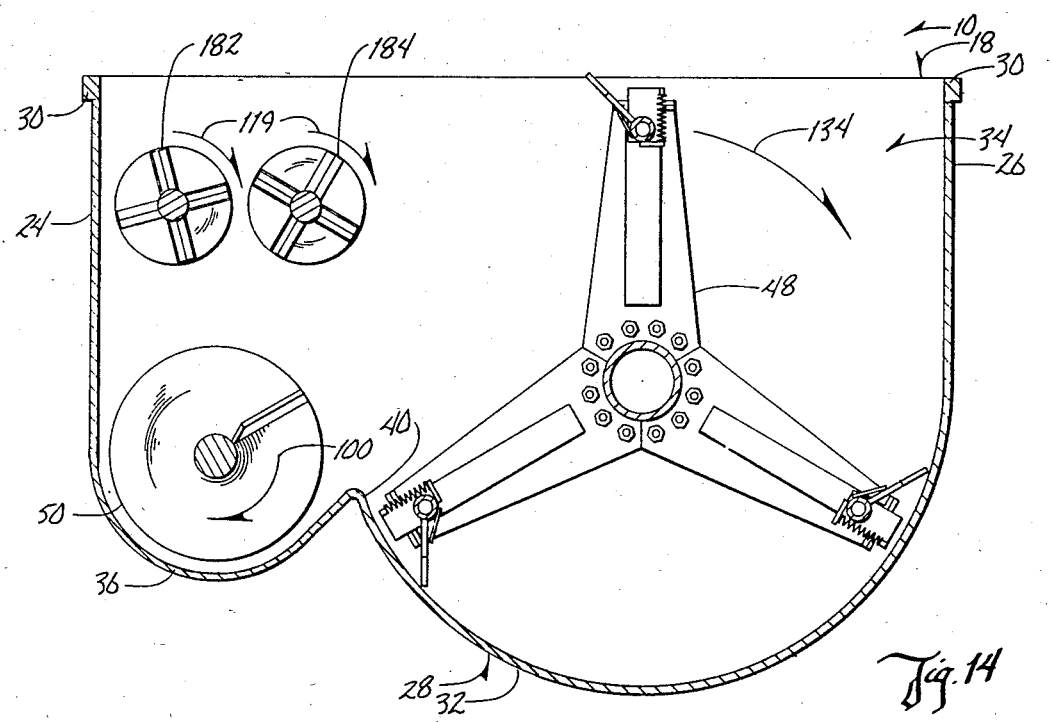
FIG. 14 is a partially sectional end view through an alternate embodiment of the mixer including dual upper augers.

Another embodiment of the feed mixer 10 is shown in FIG. 14 wherein a pair of upper augers 182 and 184 have been substituted for the single upper auger 52 in the prior embodiment. These augers are of similar construction but of smaller diameter than the single upper auger and cooperate with one another to effect the same movement of material as described above in connection with the previous embodiment.

The vertical height of ridge 40 relative to rotor 48 and lower auger 52 is important for maximum efficiency of the feed mixer 10. Preferably ridge 40 is situated so that the material advanced over the ridge by rotor 48 is moving more in an upward vertical direction than in an outward lateral direction so that the rotor 48 feeds lower auger 50 but does not force feed it. Referring to FIG. 6, material moved onto and over ridge 40 is fluffed, not pinched, by the cooperating action of the rotor and lower auger. Any material which would tend to become pinched between the second curved wall portion 36 of bottom wall 38 and the lower auger is simply recirculated through the main chamber by rotor 48. Certainly ridge 40 should be lower than the central axis of rotor 48 and it is preferred that the auxiliary chamber is so designed that ridge 40 may also be lower than the central axis of lower auger 50 which is preferably situated lower than the central axis of the rotor 48. Whereas there is no critical location for ridge 40, there is a position of maximum efficiency. If the ridge is too high, there will be a slow discharge of material from the main chamber to the auxiliary chamber with resultant slow end-to-end mixing. If the ridge is too low good clean-out is not achieved because of the resulting gap between the rotor and lower auger.

Likewise, whereas specific dimensions are not critical to the feed mixer 10, one operative embodiment has been constructed with the following dimensions. The first curved wall portion 32 of main chamber 34 has an inside radius dimension of $34\frac{1}{4}$ inches for a 10 foot long tank. A 16 inch diameter upper auger rotating at 75 rpm drives a 20 inch lower auger rotating at 50 rpm which, in turn, drives the rotor at approximately 7 to 8 rpm.

Specific rotational speeds for the rotor and augers are not critical to the present invention but are preferably set to achieve maximum use capacity for the mixer. If the rotor is rotated too slowly, for example, the mixing rate is likewise slowed and if the rotor is moved too fast, the falling action of material over the rotor bars, which greatly facilitates mixing, is inhibited.

To substantiate the improved operating efficiency of the present invention, a trailer model 560 "Quick Mixer" manufactured by Stirco, Inc. of Chatham, Ontario, Canada, was modified to embody the mixing elements of the present invention as described in the specific example above. This mixer had a 10 foot long mixing chamber and a 32 inch discharge under the secondary rotor. The mixer was loaded with 7350 pounds of one year old corn silage but since it was too full to see the rotor bars, it was unloaded to 6570 pounds. After the mixer was leveled and run for three minutes, silage sample 0 from the chart below was taken from the mixer. One hundred pounds of fine rock salt (39% sodium) was then added at a point A centered over the rotor and 12 inches from the rear of the mixer. The tractor used was a 4020 John Deere and the engine speed was set at 1250 to 1400 rpm. Other samples were to be taken at point B situated 32 inches forwardly of point A, point C situated 32 inches forwardly of point B and point D situated 32 inches forwardly of point C and 12 inches rearwardly of the front of the mixer.

The mixer was run for thirty seconds and was then stopped to take the first samples $\frac{1}{2}$ A, $\frac{1}{2}$ B, $\frac{1}{2}$ C and $\frac{1}{2}$ D by taking three handsful at each point A, B, C and D and placing the samples in sealed plastic bags. The mixture was then run another thirty seconds for samples 1A, 1B, 1C and 1D and continuously thereafter at thirty second intervals until a five minute mixing time was complete. At each interval, a sample was also taken from discharge while unloading. The parts per million of sodium for each sample are recorded in the chart below. The First Test was run on the mixer prior to modification and the Second Test reflects the improved performance after modification to include the features of the present invention as shown in FIGS. 1–13. Since the pure silage sample 0 in the First Test had 80 parts per million of sodium, 80 P.P.M. should be deducted from each sample for true results.

Likewise, the results recorded in the Second Test are a multiple of a certain factor, but are proportionally correct and show the improved mixing performance.

| SALT TEST RESULTS | | | |
|---|---|---|---|
| First Test | | Second Test | |
| Sample No. | Sodium, (p.p.m.) | Sample No. | Sodium, (p.p.m.) |
| 0 | 80 | 0 | 30 |
| 0 Unload | 4210 | $\frac{1}{2}$A | 1872 |
| $\frac{1}{2}$A | 3330 | $\frac{1}{2}$B | 330 |
| $\frac{1}{2}$B | 12500 | $\frac{1}{2}$C | 722 |
| $\frac{1}{2}$C | 1060 | $\frac{1}{2}$D | 83 |
| $\frac{1}{2}$D | 173 | 1A | 452 |
| $\frac{1}{2}$ Unload | 5430 | 1B | 440 |
| 1A | 10100 | 1C | 1556 |
| 1B | 12900 | 1D | 550 |
| 1C | 1290 | 1$\frac{1}{2}$A | 690 |
| 1D | 283 | 1$\frac{1}{2}$B | 720 |
| 1 Unload | 8070 | 1$\frac{1}{2}$C | 500 |
| 1$\frac{1}{2}$A | 5410 | 1$\frac{1}{2}$D | 282 |
| 1$\frac{1}{2}$B | 9910 | 2A | 900 |
| 1$\frac{1}{2}$C | 2330 | 2B | 858 |
| 1$\frac{1}{2}$D | 443 | 2C | 878 |
| 1$\frac{1}{2}$ Unload | 5530 | 2D | 824 |
| 2A | 3660 | 2$\frac{1}{2}$A | 966 |
| 2B | 7580 | 2$\frac{1}{2}$B | 898 |
| 2C | 3650 | 2$\frac{1}{2}$C | 620 |
| 2D | 359 | 2$\frac{1}{2}$D | 444 |
| 2 Unload | 4630 | 3A | 720 |
| 2$\frac{1}{2}$A | 4590 | 3B | 872 |
| 2$\frac{1}{2}$B | 3270 | 3C | 902 |
| 2$\frac{1}{2}$C | 2060 | 3D | 102 |
| 2$\frac{1}{2}$D | 667 | 4A | 764 |

-continued

SALT TEST RESULTS

| First Test | | Second Test | |
|---|---|---|---|
| Sample No. | Sodium, (p.p.m.) | Sample No. | Sodium, (p.p.m.) |
| 2½ Unload | 3690 | 4B | 796 |
| 3A | 2770 | 4C | 738 |
| 3B | 7150 | 4D | 644 |
| 3C | 4590 | 5A | 674 |
| 3D | 478 | 5B | 774 |
| 3 Unload | 2350 | 5C | 638 |
| 4A | 5780 | 5D | 634 |
| 4B | 6270 | 0 Unload | 206 |
| 4C | 2090 | 10 Unload | 348 |
| 4D | 561 | 20 Unload | 164 |
| 4 Unload | 3580 | 30 Unload | 702 |
| 5A | 5640 | 40 Unload | 308 |
| 5B | 3440 | 50 Unload | 186 |
| 5C | 2480 | 60 Unload | 200 |
| 5D | 1220 | Final Unload | 201 |
| 5 Unload | 2290 | | |
| Final Unload | 1120 | | |

In the second test, it is apparent that substantially uniform distribution of the salt was achieved after two minutes of mixing.

In addition to the salt tests, other performance comparisons were made on the same mixer before and after modification. Those results are reported in the chart below.

ADDITIONAL TEST RESULTS

| Capacity | Before Modification | After Modification |
|---|---|---|
| Full capacity lbs. of Whole Corn | 13,000 | 14,860 |
| Cu. Ft. Capacity | 285 | 325 |
| Lbs. Silage - Full Test | 7,190 | 9,570 |
| Lbs. Silage - Maximum | 7,720 | 10,920 |
| Empty Mixer Weight | 6,940 | 8,160 |
| Unloading Time - Silage | 6,650 lb. in 4 min. (13,000 lb. load) | 9,120 lb. in 1¼ min. (15,800 lb. load) |
| Unloading Time - Corn | 6 min.-1,000 lb. left 20 min.-380 lb. left | 1 min.-300 lb. left 1½ min.-120 lb. left |
| Unloading Time - Corn, Silage, Hay and Feed Mix | 4 min. 80% out 6 min. 95% out 8 min. 98% out | 45 sec. all out |
| Visual Test with Lima Beans Loaded in Front | Beans found at rear after 5 min. mix. | Beans found at rear after 2 min. mix. |
| Beans Loaded at Front on Silage | Very few | Even all over |
| 380 lb. whole corn in rear. Equal bulk of silage in front | Corn stayed in rear almost no mix.; after 5 min., silage stayed in front | Both went to front & mixed. All feed in front. Mix complete in 1 min. |
| Discharge Location | Center - Cannot see from tractor | Front Good vision |
| Spout Wind Loss | High | Minimum |

Figure 15:
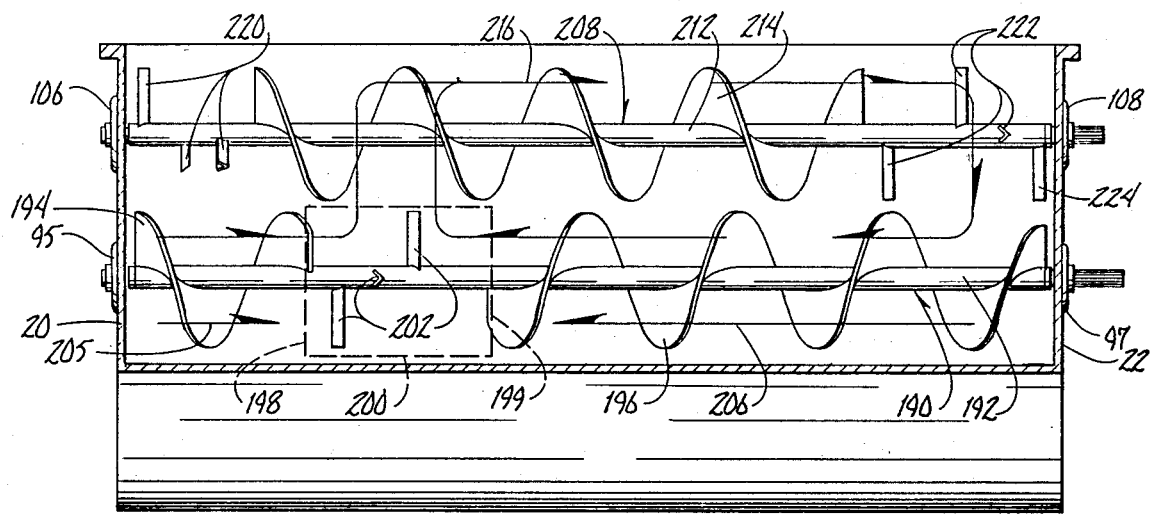
FIG. 15 is a partially sectional side view showing the stacked augers in the auxiliary chamber of a 10-foot center discharge mixer.
Figure 16:
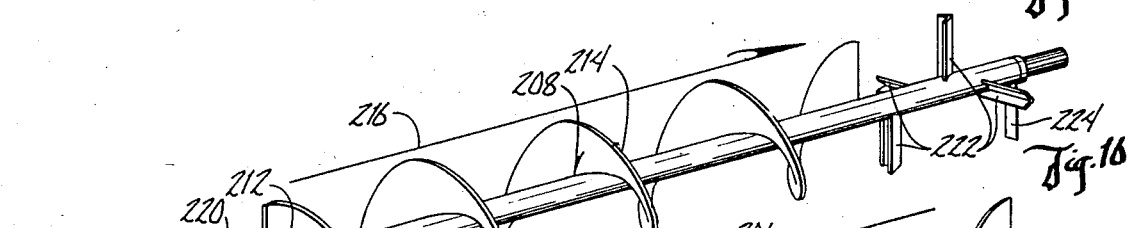
FIG. 16 is a perspective view of the upper auger thereof.
Figure 17:
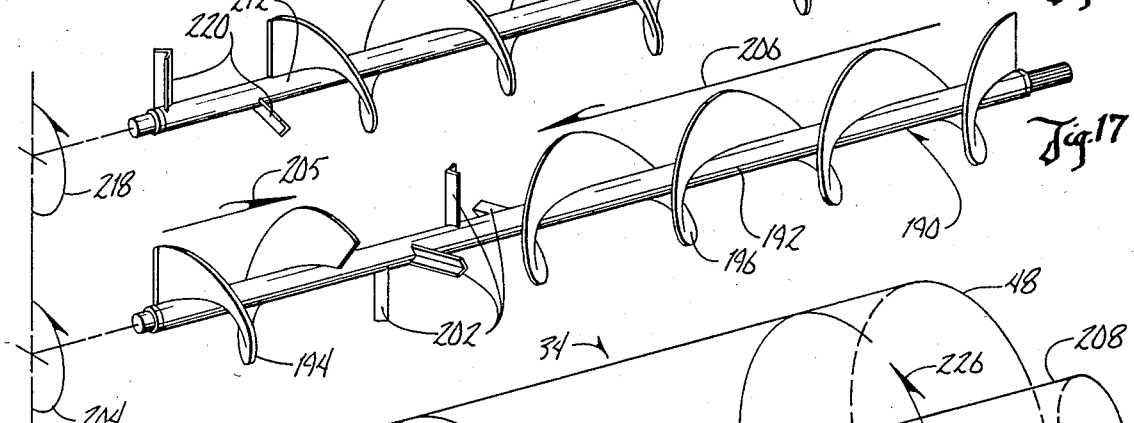
FIG. 17 is a perspective view of the lower auger thereof.
Figure 18:
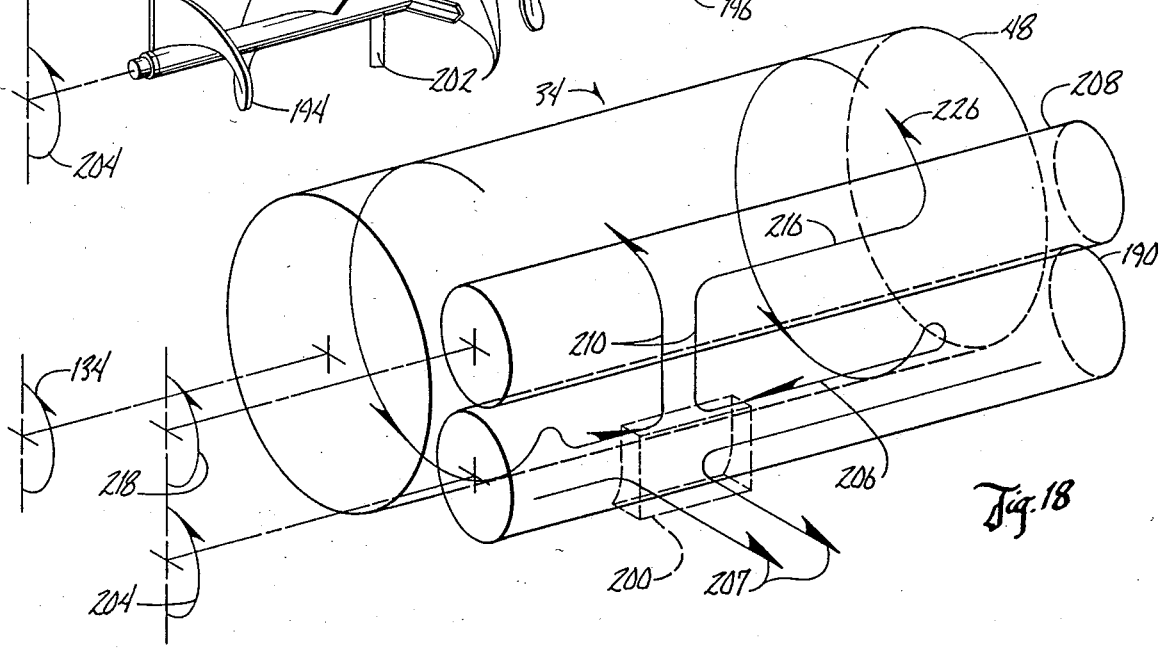
FIG. 18 is a diagrammatic perspective illustration of the flow path of material through the mixer of FIG. 15.
Figure 19:
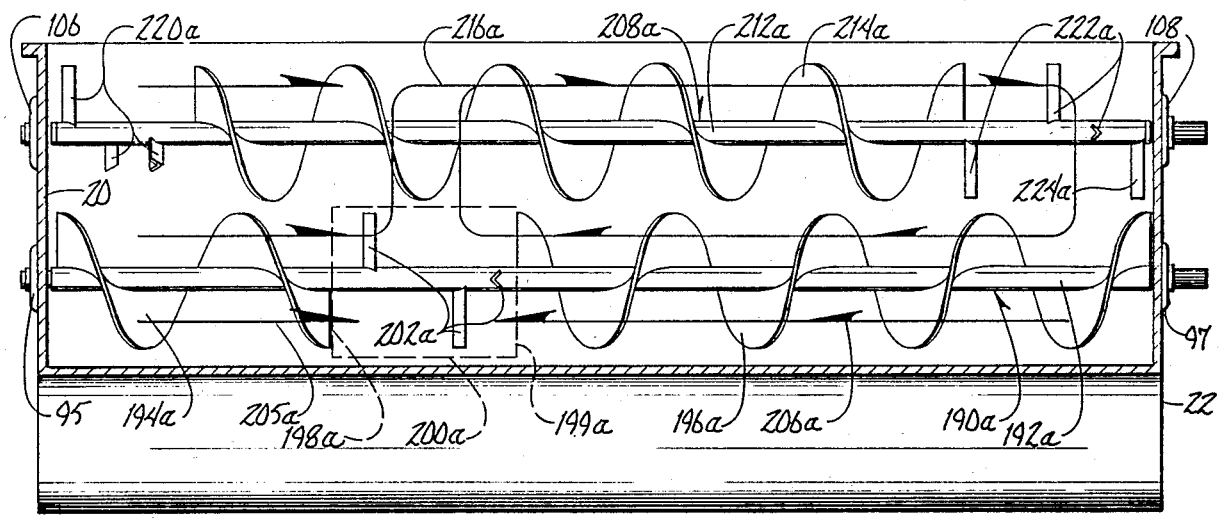
FIG. 19 is a partially sectional side view showing the stacked augers in the auxiliary chamber of a 12-foot center discharge mixer.
Figure 20:
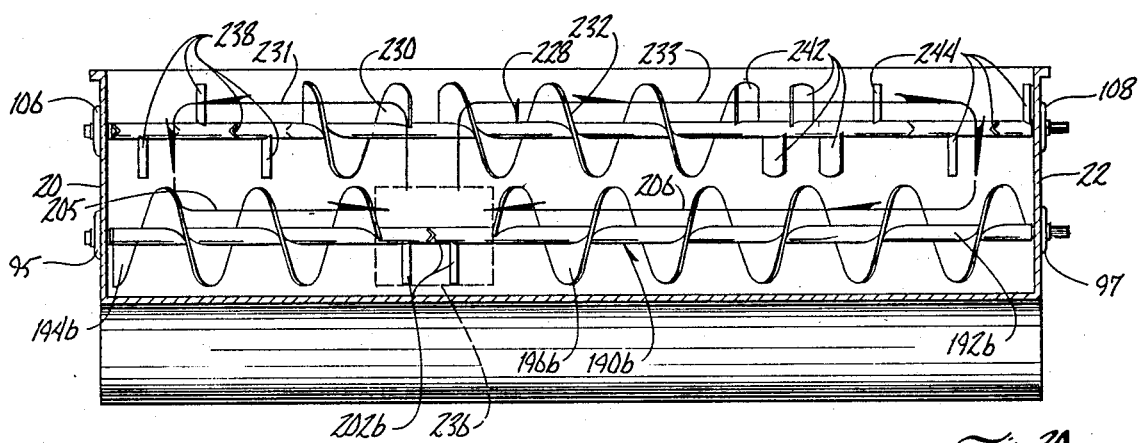
FIG. 20 is a partially sectional side view showing the stacked augers in the auxiliary chamber of a 14-foot center discharge mixer.
Figure 21:
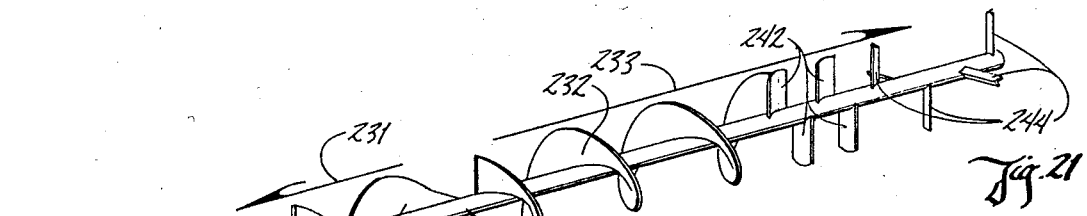
FIG. 21 is a perspective view of the upper auger thereof.
Figure 22:
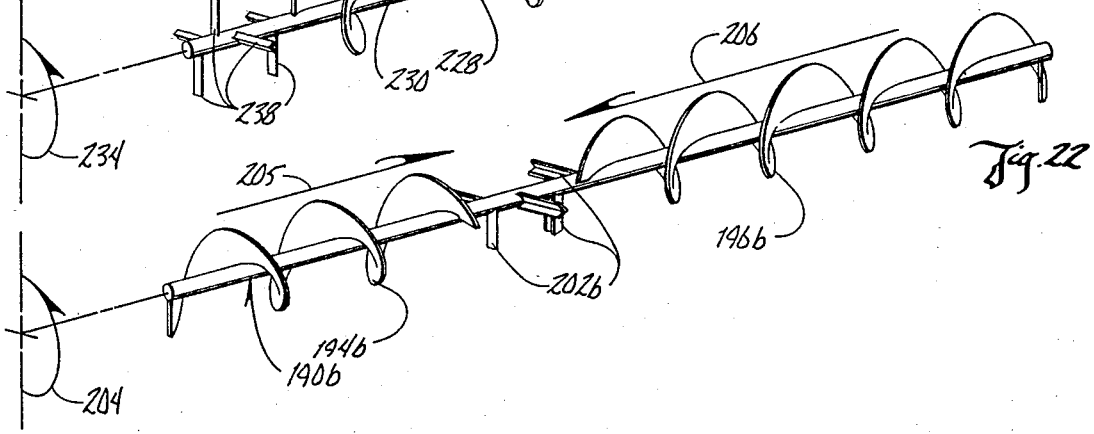
FIG. 22 is a perspective view of the lower auger thereof.
Figure 23:
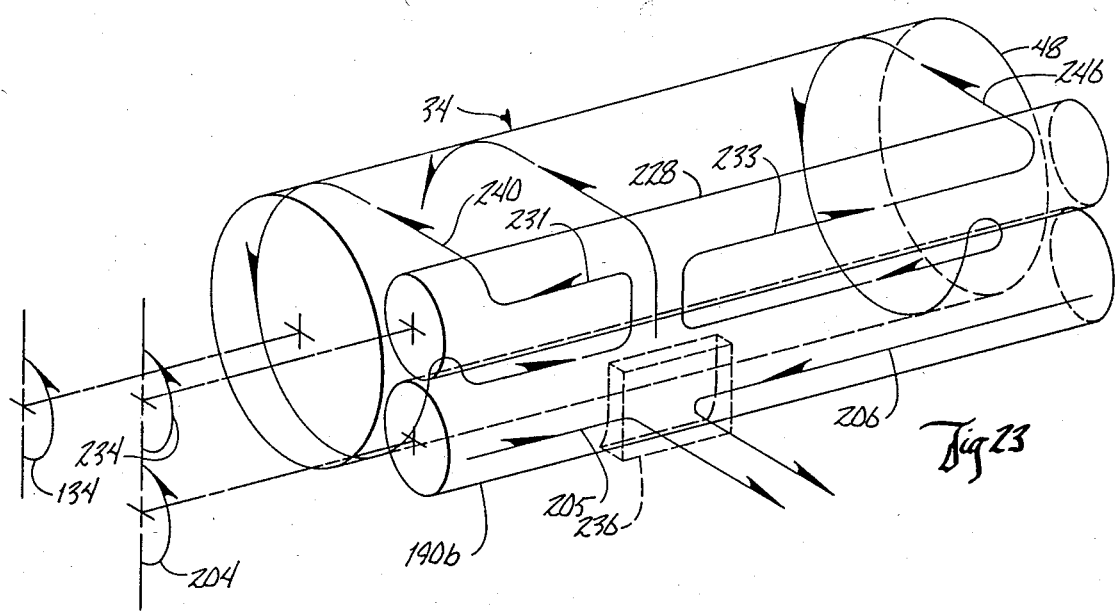
FIG. 23 is a diagrammatic perspective illustration of the flow path of material through the mixer of FIGS. 20 and 24.
Figure 24:
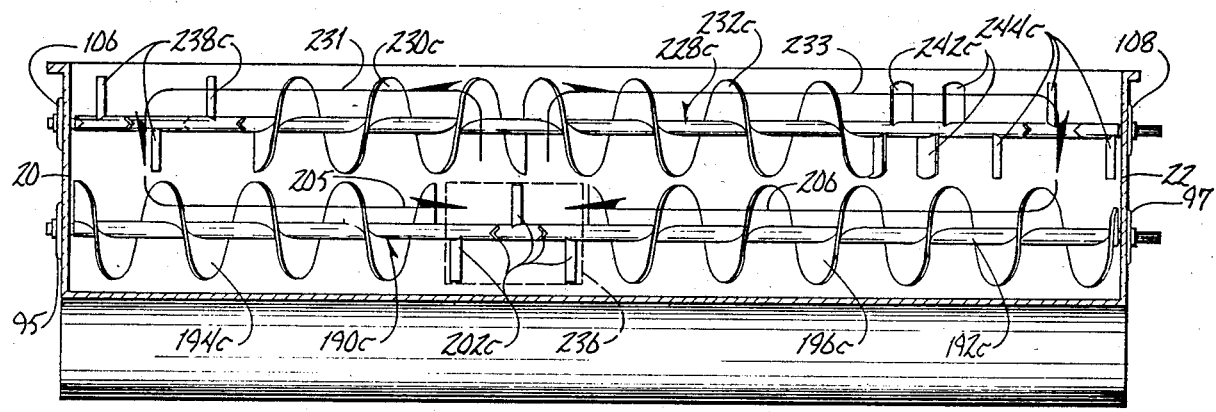
FIG. 24 is a partially sectional side view showing the stacked augers in the auxiliary chamber of a 16-foot center discharge mixer.

FIGS. 15-24 are directed to several additional embodiments of the invention which are collectively referred to as "center discharge" mixers. Actually, the discharge openings are not longitudinally centered on the tanks but are offset forwardly thereof. FIGS. 15-17 are directed to a mixer having a 10-foot long mixing chamber; FIG. 19 shows a mixer with a 12-foot long mixing chamber; FIGS. 20-22 show a mixer with a 14-foot long mixing chamber; and finally, FIG. 24 shows a mixer with a 16-foot long mixing chamber.

Since many of the parts of these mixers are identical to those disclosed in the prior embodiment of FIGS. 1-13, like reference numerals are used to identify like parts of each.

In the 10-foot mixer of FIG. 15, lower auger 190 is supported on end walls 20 and 22 by bearings 95 and 97. Shaft 192 has a forward flighting section 194 and a rearward flighting section 196 which extend from positions closely adjacent the forward and rearward end walls 20 and 22 to positions substantially registered with the forward and rearward edges of discharge opening 200, indicated by dotted line in the drawing. Four radially extended paddles in the form of angle iron members 202 are arranged in axially and circumferentially spaced-apart relation on the lower auger 190 between flighting sections 194 and 196 at positions registered with the discharge opening 200, i.e. within the longitudinal extent of the discharge opening as indicated in FIG. 15.

The forward and rearward flighting sections 194 and 196 are reverse flighting sections such that upon rotation of lower auger 190 in the direction of arrow 204 in FIG. 18, material is converged toward the discharge opening from opposite ends of the mixer as indicated by arrows 205 and 206 in FIG. 15. The angle iron members 202 situated adjacent the reverse flighting sections 194 and 196 include respective surfaces which are inclined relative to a plane perpendicular to the axis of the auger for retarding the axial movement of material toward the discharge opening in response to rotation of the lower auger. These facilitate the discharge of material, as indicated by arrows 207 in FIG. 18, when the discharge opening is opened; and facilitate the piling up of material toward the upper auger 208, as indicated by arrows 210 in FIG. 18 when the discharge opening is closed.

Upper auger 208 is likewise rotatably supported by bearings 106 and 108. The shaft 212 carries an elongated flighting section 214 for directing material rearwardly in the direction of arrow 216 in response to rotation of the upper auger in the direction of arrow 218 indicated in FIG. 18. The opposite ends of the flighting section 214 are substantially spaced from the forward and rearward end walls 202 and 22 and a plurality of radially extended paddles are arranged in axially and circumferentially spaced-apart relation on the upper auger between each end of the flighting section 214 and the adjacent end wall. At the forward end, a series of angle iron members 220 are oriented with their inclined surfaces directed for advancing material rearwardly in response to rotation of the auger. At the rearward end, another series of angle iron members 222 are provided for chopping material and advancing it rearwardly. At least the endmost angle iron member 224 is oriented for retarding the rearward movement of material toward end wall 22 to prevent any piling up of material at that end wall. Rather, material simply spills over into the main chamber as indicated by arrow 226 in FIG. 18 for circulation through the main chamber back to the lower portion of the auxiliary chamber. As indicated by the various arrows in FIG. 18, material is continuously calculated both circumferentially and axially throughout the mixing unit.

In the 12-foot mixer of FIG. 19, the structure and operation of parts is similar to that described for the 10-foot mixer but for certain dimensional variations including the longitudinal extension of the various flighting sections on the augers. Accordingly, like parts of the 12-foot mixer are referred to by like reference numerals but with an added suffix "a".

In the 14-foot mixer of FIG. 20, the lower auger 190b is similarly constructed as in the 10 and 12-foot mixers, again but for the longitudinal extensions of the flighting sections. The upper auger 228, however, has several structural distinctions.

Upper auger 228 is provided with reverse flighting sections including forward flighting section 230 for moving material forwardly in the direction of arrow 231 and a rearward flighting section 232 for moving material rearwardly in the direction of arrow 233 in response to rotation of the upper auger in the direction of arrow 234 in FIG. 21. The adjacent ends of the forward and rearward flighting sections terminate at positions within the longitudinal extent of the discharge opening 236 as seen in FIG. 20. Between end wall 20 and forward flighting section 230, a plurality of angle iron paddles 238 are provided on the upper auger. These paddles are generally oriented for urging material forwardly in the direction of arrow 231, although the endmost one or two angle iron members adjacent wall 20 may be reversed for retarding the forward movement of material to facilitate spillage over into the main chamber as indicated by arrow 240 in FIG. 23.

Just rearwardly of rear flighting section 232, the upper auger 228 is provided with several radially directed fins 242, which fins are inclined 45° relative to a plane perpendicular to the axis of the upper auger so as to operatively urge material rearwardly in the direction of arrow 233 in response to rotation of the upper auger. Rearwardly of fins 242, a plurality of angle iron members 244 are arranged in axially and circumferentially spaced-apart relation for further mixing of material. Again, these angle iron members 244 are oriented for moving material rearwardly in the direction of arrow 233, but for the one or two angle iron members closest to rearward wall 22 which are reversed for retarding the rearward movement of material to facilitate spillage back into the main chamber as indicated by arrow 246 in FIG. 23.

FIG. 24 illustrates a 16-foot mixer and includes parts generally corresponding to those described in connection with the 14-foot mixer of FIG. 20, but for the longitudinal extent of the flighting sections and axial positions of the various paddles as indicated in FIG. 24. Accordingly, like parts are referred to by like reference numerals, but with the suffix "c".

The flow diagrams of FIGS. 18 and 23 illustrate that the center discharge mixers are operative to provide thorough mixing of materials both radially and axially throughout the mixers. These center discharge mixers tend to overcome the problem of material tending to pile up against one end wall and thereby slowing the mixing action. Test samples taken from the center discharge mixers according to the invention indicate that the mixing action is so efficient that substantial consistency on the basis of moisture content and protein can be achieved throughout the mixer after only three minutes of operation.

Whereas preferred embodiments of the mixer have been shown and described herein, it is apparent that various modifications, additions and substitutions may be made which are within the intended broad scope of the appended claims. For example, in mixers used to handle fertilizer or sludge, the endmost paddles on the augers may be replaced by a single section or pitch of reverse flighting and the discharge opening may be situated on the underside of the auxiliary chamber. Even on side discharge models for gain and the like, it is advantageous to provide, as an accessory, a trap door through the underside of the auxiliary chamber for discharge through the floor screen of a grain elevator. In mixers used for hay and like roughage, the flighting on the lower auger may be provided with peripheral knotching to grab and pull the hay in the desired direction.

Thus there has been shown and described herein a feed mixer and method of mixing material therein which accomplish at least all of the stated objects.

We claim:

1. A material mixer, comprising
   a mixer tank including forward and rearward end walls, a bottom wall and opposite side walls,
   said bottom wall including a first relatively large curved wall portion defining the bottom of a main chamber, a second relatively smaller curved wall portion defining the bottom of an auxiliary chamber, and an enlongated ridge at the junction of said curved wall portions,
   said second curved wall portion including a discharge opening at a position substantially spaced from both end walls, a movable door and means for selectively moving said door to close and open said discharge opening,
   a rotor rotatably supported within said main chamber for mixing materail therein and moving material across said first wall portion toward said auxiliary chamber,
   a lower auger having opposite end portions and reverse flighting sections on said opposite end portions for moving material in opposite axial directions in response to rotation of said lower auger,
   means for supporting said lower auger in said auxiliary chamber adjacent said second wall portion for rotation in a direction to move material axially toward said discharge opening,
   an upper auger,
   means for supporting said upper auger in said auxiliary chamber above said lower auger for rotation in a direction to move material axially of said upper auger, and
   drive means for rotating said rotor and upper and lower augers.

2. The mixer of claim 1 wherein said upper auger has opposite end portions and reverse flighting sections on said opposite end portions operative for moving material axially away from said discharge opening in opposite directions toward said end walls.

3. The mixer of claim 2 wherein the reverse flighting sections on said upper auger have ends disposed in closely adjacent relation at positions axially registered with said discharge opening.

4. The mixer of claim 1 wherein said reverse flighting sections on said lower auger are positioned in axially spaced-apart relation and further comprising a plurality of radially extended paddles arranged in axially and circumferentially spaced-apart relation on said bottom auger between said flighting sections at positions registered with said discharge opening.

5. The mixer of claim 4 wherein said reverse flighting sections extend from positions closely adjacent said forward and rearward end walls to positions substantially registered with the forward and rearward edges of said discharge opening.

6. The mixer of claim 4 wherein at least some of said paddles are situated adjacent said reverse flighting sections and include respective surfaces which are inclined relative to a plane perpendicular to the axis of the auger for retarding the axial movement of material from the adjacent flighting section toward the discharge opening in response to rotation of said lower auger.

7. The mixer of claim 6 wherein said paddles comprise angle iron members.

8. The mixer of claim 1 wherein said upper auger has at least one flighting section with opposite ends axially spaced from said forward and rearward end walls and a plurality of radially extended paddles arranged in axially and circumferentially spaced-apart relation on said upper auger between each end of the flighting section and the adjacent end wall.

9. The mixer of claim 8 wherein the paddles on said upper auger which are situated closest to said forward and rearward end walls have inclined surfaces adapted for moving material away from the respective adjacent end wall in response to rotation of said upper auger.

10. The mixer of claim 1 wherein said discharge opening is axially offset from the longitudinal center of said tank toward the forward end thereof.

11. A method of mixing material, comprising
providing an elongated mixer tank having longitudinally spaced-apart forward and rearward end walls, opposite side walls and a bottom wall including a first relatively large curved wall portion defining the bottom of a main chamber, a second relatively smaller curved wall portion defining the bottom of an auxiliary chamber and having a discharge opening therein substantially spaced from said forward and rearward end walls and an elongated ridge at the juncture of said curved wall portions, loading material into said mixer tank, moving at least one elongated rotor bar in a rotary path adjacent and across said first wall portion and substantially spanning said main chamber, thereby mixing material in said main chamber and moving at least a portion of said material over said ridge to said auxiliary chamber, mixing material in a lower portion of said auxiliary chamber adjacent said second wall portion while simultaneously converging material from opposite directions toward said discharge opening longitudinally across said lower portion of said auxiliary chamber, and mixing material in an upper portion of said auxiliary chamber while simultaneously advancing material longitudinally across said upper portion and spilling material back into said main chamber.

12. The method of claim 11 wherein the step of advancing material longitudinally across said upper portion comprises advancing material in opposite longitudinal directions away from said discharge opening and toward said forward and rearward end walls.

* * * * *